F. STEBLER.
FRUIT CLEANER.
APPLICATION FILED FEB. 7, 1907.

928,558.

Patented July 20, 1909.

Witnesses:

Inventor:
Fred Stebler:
By Townsend Lyon, Hackley & Knight
his Attys

UNITED STATES PATENT OFFICE.

FRED STEBLER, OF RIVERSIDE, CALIFORNIA.

FRUIT-CLEANER.

No. 928,558.  Specification of Letters Patent.  Patented July 20, 1909.

Application filed February 7, 1907. Serial No. 356,279.

*To all whom it may concern:*

Be it known that I, FRED STEBLER, a citizen of the United States, residing at Riverside, in the county of Riverside and State of California, have invented a new and useful Fruit-Cleaner, of which the following is a specification.

This invention is intended for cleaning or washing fruit, particularly oranges, and the main object is to provide for cleaning or washing the fruit automatically in a thorough and rapid manner, without the liability of damaging the fruit.

Another object is to provide an open sided brushing conduit or channel having its top formed from independent members, vertically movable at the open side, whereby the fruit or other object to be treated or acted upon can enter the conduit at any point by lifting up one or more of said members and will then be held against the opposite wall or walls of the conduit by the pressure of the said members.

Another object of the invention is to enable a yielding pressure to be brought upon the fruit and to subject all sides of each orange or other fruit, equally to the washing and scouring action.

Figure 1:
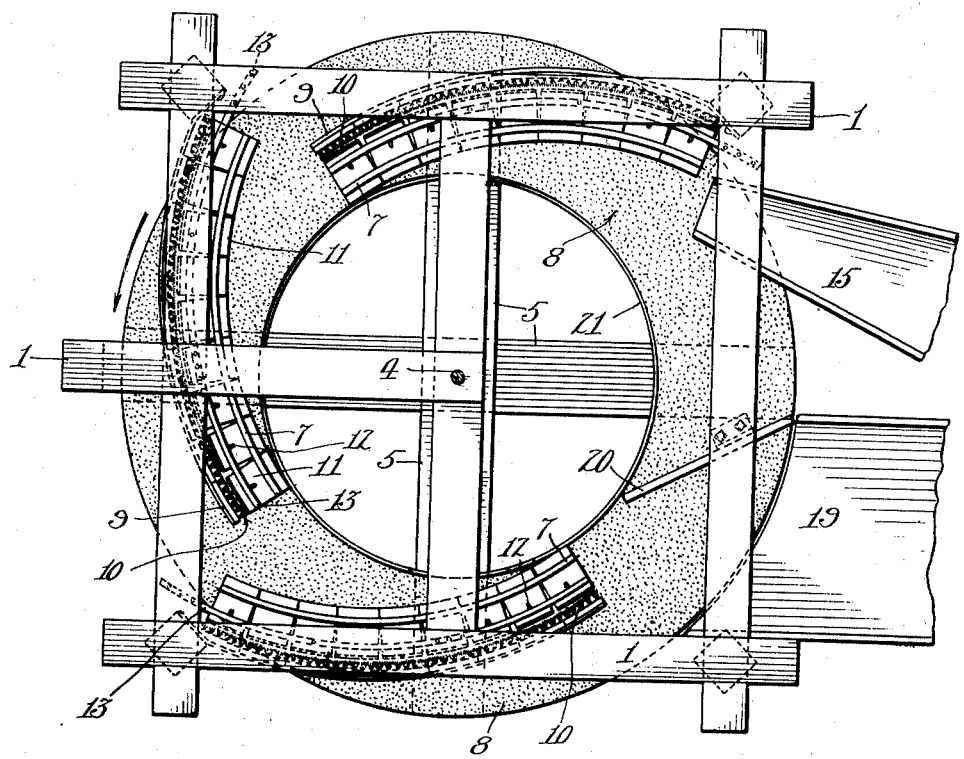
Figure 2:
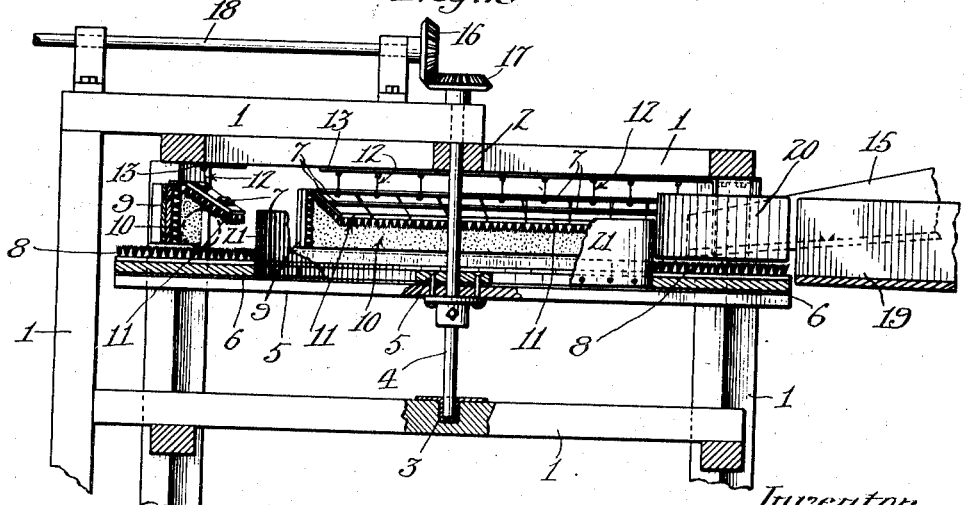

In the accompanying drawings:—Figure 1 is a plan of the machine. Fig. 2 is a vertical section thereof.

In the form or embodiment of the invention as disclosed in the drawings, the machine comprises a frame 1 in which is mounted to rotate in bearings 2, 3, a vertical shaft or axis 4 carrying a rotary frame or spider 5 consisting of cross arms carrying an annular table or disk 6. The machine is intended to be used in a body of water, being, for example, placed in a tank, the water in the tank extending somewhat above the said table so that the table is submerged in the body of water. On the upper face of the table are fixed brushes 8 forming a continuous brush surface on the top of the table. The frame 1 carries above this brush surface one or more deflectors 9 which are also provided with brushes 10 on their inner faces, said deflectors extending preferably obliquely inward from the peripheral portion of the table toward the inner portion thereof, this oblique inward direction being in the direction of the rotation of the table. There are preferably a plurality of these oblique deflectors, each extending through a portion of the circumference of the table and each having its outer end located outwardly from the inner end of the preceding deflector, to receive the fruit discharged from such preceding deflector. The frame 1 also carries a plurality of brushes 11 extending in continuous series at a sufficient distance above the brush surface of the table 6 to enable the fruit to roll between the table brush surfaces and the bottoms of the suspended brushes. Said brushes 11 are preferably arranged radially relatively to the deflector to which they are flexibly secured at their outer ends, as by means of a pliable strip 7, as of leather, which acts as a hinge. This permits the inner or free end of each member to move vertically independently of the others whereby the fruit can enter the conduit at any point by lifting up one or more of the members, after which the weight of the brush will cause it to press gently upon the fruit and also force the fruit outwardly against the deflector, and it will also permit of fruit of different sizes passing through the conduit. These brushes may be hung by flexible suspension means 12 so that they are relatively movable, to some extent, the brushes being arranged in partial circles and the suspension means being attached to a corresponding number of arcs or broken rims 13 on frame 1. The suspension means 12 is attached to each brush at such a point as to cause the brush to tip slightly inward and downwardly toward the center of the table and the brush faces of the brushes 11 to face obliquely outward toward and adjacent to the inner faces of the deflectors causing the pressure of the brushes on the fruit to act in holding or pressing the fruit outwardly against the brushes on the deflectors. By constructing and arranging the brushes in this manner each deflector 9 and its series of inclined members, together with the portion of the table top immediately adjacent thereto, forms a semi-circular conduit or channel, substantially triangular in cross section, and open upon its inner side. Where there are a plurality of these conduits or channels, as in the present instance, they are preferably arranged eccentrically to the center of the table with the outer end of each succeeding conduit slightly in advance of and at a greater radial distance from the center of the table than the discharge end of the preceding one. This causes the fruit to travel inward toward the center while passing through each conduit but permits of its being thrown outward by centrifugal force from the discharge end of one conduit toward the entrance of the next one. If, however, the speed of the table is not sufficient to carry the fruit outward quick enough to enter at the mouth of the conduit the fruit can enter any conduit at any point as it will be forced in under any one of the hinged members with which it comes in contact, after which it will pass on to the end of the conduit and be discharged therefrom in the same manner as though it had traversed the entire length of the conduit. This permits of the table being run at any convenient speed although it is desirable to run it fast enough to cause the fruit to enter each conduit as near its mouth as possible as it will thereby receive the maximum amount of brushing before it is discharged from each conduit.

15 represents a chute for supply of fruit to the washer.

The rotary table is driven by any suitable means such as gearing 16, 17 operating the table shaft 2 from the driving shaft 18. The direction of rotation is such that the brush surface of the table is continually moving toward the inner or brush face of the deflector, so as to press the fruit against the deflector.

The operation is as follows:—The table being set in rotation in the direction of the arrow, and the fruit being supplied by chute 15 passes onto the table at or near the outer portion of the table and is carried around by the rotary motion thereof, passing beneath the suspended brushes 11, and being pressed downwardly by said brushes, and also pressing outwardly by centrifugal action, so as to come against the brush surfaces of the deflectors 9. These brush surfaces extending obliquely inward, the fruit exerts more pressure thereon than it would with brush surfaces concentric to the table as the fruit is deflected by the brush surfaces inwardly in opposite direction to centrifugal action. The combined effect of the bottom, top and outer brushes is to roll and scour the fruit so that every portion is evenly subjected to the brushing action. The top brushes press on the fruit in a line oblique to the pressing of the other brushes and at a point opposite the point between the points of pressure of the other brushes, and this, in connection with the greater pressure of the deflector brushes, due to centrifugal action, insures the spiral or irregular rotation desired.

After leaving the first deflector the fruit is caught by the second deflector and again subjected to the brushing action, and so on for as many operations as may be necessary to clean the fruit, and after leaving the last deflector the fruit is discharged by centrifugal action from the table and passes into the portion of the tank reserved therefor, and can be collected and removed automatically or by hand as may be desired.

I have herein shown and described one embodiment of my invention so far as the same relates to the provision of an open sided brushing conduit, preferably triangular in cross section and preferably having a top inclined downwardly toward the open side of the conduit and vertically movable. In my co-pending application Serial No. 363,516, filed March 20, 1907, I have shown another embodiment of this portion of my invention.

What I claim is:—

1. A fruit cleaner comprising an open sided brushing conduit, and means for carrying the fruit horizontally into and through said conduit.

2. A fruit cleaner comprising an open sided brushing conduit, the top of which is movable vertically at the open side, and means for carrying the fruit horizontally into and through said conduit.

3. A fruit cleaner comprising an open sided brushing conduit, substantially triangular in cross section, the top being inclined downwardly toward the open side and vertically movable, and means for carrying the fruit into and through said conduit.

4. A fruit cleaner comprising an open sided brushing conduit, the top of which is formed from independent members, each having the end at the open side of the conduit movable vertically and hinged at the other end, and means for carrying the fruit into and through said conduit.

5. A fruit cleaner comprising an open sided, curved brushing conduit, substantially triangular in cross section, the top being formed from independent members arranged substantially radially relatively to the center of the conduit, the outer end of each member being hinged and the inner end inclining downwardly and being vertically movable, and means for carrying the fruit into and through said conduit.

6. A fruit cleaner comprising a plurality of open sided, curved, brushing conduits arranged eccentrically to a common center and each having its top formed from inclined independent members, the outer end of each member being hinged and the inner end being at the open side of the conduit and vertically movable, and means for carrying the fruit into and through said conduits.

7. A fruit cleaner comprising a horizontal rotary table, means for rotation thereof, a plurality of deflectors each extending obliquely inward above the table, through a portion of a circumference, the outer end of each deflector being located outwardly from the inner end of the preceding deflector, to receive the fruit therefrom; means for supplying fruit to the outer part of the table, and means for receiving the fruit discharged from the table.

8. A fruit cleaner comprising a horizontal rotary table, means for rotation thereof, a deflector extending obliquely inward above said table in the direction of rotation of the table, and provided with an inwardly facing brush surface, brush means extending above the table adjacent to said brush surface, said brush means being yieldingly supported and facing obliquely outward to press the fruit against the deflector, and means for supplying fruit at the outer part of the table.

9. A fruit cleaner comprising a horizontal rotary table, means for rotation thereof, a deflector extending obliquely inward above said table, in the direction of rotation thereof and provided with an inwardly facing brush surface, separate relatively movable brushes yieldingly supported adjacent to the inner faces of the deflectors and facing obliquely outward to press the fruit against the deflector.

10. A fruit cleaner comprising a horizontal rotary table having a brush surface on its top, means for rotation of said table, deflectors extending obliquely inward above said table, in the direction of rotation thereof, and provided with an inwardly facing brush surface, separate relatively movable brushes yieldingly supported adjacent to the inner faces of the deflectors and facing obliquely outward to press the fruit against the deflectors.

11. A fruit cleaner comprising a horizontal table, mounted to rotate on a vertical axis, means for rotation of said table, a deflector extending obliquely inward above said table in the direction of rotation of the table, and provided with an inwardly facing brush surface, and upper brush means facing obliquely outward and downward toward the deflector to press on the fruit in a direction oblique to the pressure of the table and deflector.

12. A fruit cleaner comprising a rotary flat brushing surface, and a plurality of curved brushing conduits arranged consecutively thereupon, each conduit extending from the periphery of the surface diagonally inward toward the center and consisting of an outer vertical wall and an inwardly extending top wall, the top wall being vertically movable at its inner edge, means for feeding fruit to said brushing surfaces, and means for discharging it therefrom.

13. A fruit cleaner comprising a forwardly movable horizontal brushing and conveying surface, a vertical brushing surface above the same and arranged diagonally thereof, an inclined brushing surface adjacent to and adapted to form a conduit with said other surfaces, and means for adjusting the inclined surface vertically and angularly relatively to said two surfaces.

14. A fruit cleaner comprising a forwardly movable, horizontal brushing and conveying surface, a vertical brushing surface arranged diagonally above the same, an inclined brushing surface adjacent to said surfaces, and means for yieldingly holding the inclined surface toward the vertical surface.

15. A fruit cleaner having a forwardly movable, horizontal brushing conveying surface, a vertical brushing surface above the same and arranged diagonally thereof, and a brush surface arranged above and forming in conjunction with said movable brushing surface and said vertical brushing surface a substantially triangular brushing conduit extending obliquely to the movement of said conveying surface.

In testimony whereof, I have hereunto set my hand at Los Angeles, California, this 29th day of January, 1907.

FRED STEBLER.

In presence of—
ARTHUR P. KNIGHT,
FREDERICK S. LYON.